US012561128B2

(12) United States Patent
Ben Zakai et al.

(10) Patent No.: US 12,561,128 B2
(45) Date of Patent: Feb. 24, 2026

(54) FILE UPLOAD VALIDATION

(71) Applicant: SailPoint Technologies, Inc., Wilmington, DE (US)

(72) Inventors: David Ben Zakai, Ramat Gan (IL); Eldar Kleiner, Tel Aviv-Jaffa (IL); Guy Guzner, Tel Aviv (IL); Yoav Horman, Tel Aviv (IL); Avishai Lazar, Etz Efraim (IL); Daniel Parolla, Rosh HaAyin (IL)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 148 days.

(21) Appl. No.: 18/498,111

(22) Filed: Oct. 31, 2023

(65) Prior Publication Data

US 2024/0061673 A1 Feb. 22, 2024

Related U.S. Application Data

(63) Continuation-in-part of application No. 17/839,550, filed on Jun. 14, 2022, now Pat. No. 12,277,209.

(51) Int. Cl.
*G06F 9/44* (2018.01)
*G06F 8/65* (2018.01)

(52) U.S. Cl.
CPC .................................. *G06F 8/65* (2013.01)

(58) Field of Classification Search
CPC ....................................................... G06F 8/65
USPC ....................................................... 717/168
See application file for complete search history.

(56) References Cited

U.S. PATENT DOCUMENTS

| | | | | |
|---|---|---|---|---|
| 7,725,931 B2 * | 5/2010 | Ito | ........................... | H04L 63/20 |
| | | | | 726/13 |
| 7,784,044 B2 * | 8/2010 | Buban | ..................... | G06F 8/658 |
| | | | | 717/168 |
| 8,578,499 B1 | 11/2013 | Zhu et al. | | |
| 8,607,208 B1 * | 12/2013 | Arnold | .................... | G06F 8/656 |
| | | | | 717/153 |

(Continued)

FOREIGN PATENT DOCUMENTS

| | | | | |
|---|---|---|---|---|
| CN | 103942073 B | * | 12/2017 | |
| EP | 3422236 B1 | | 6/2022 | |
| WO | WO-2019237590 A1 | * | 12/2019 | ......... G06F 21/6272 |

OTHER PUBLICATIONS

Wikipedia, "Salt (cryptography)," pp. 1-3, last edited Feb. 21, 2024.

(Continued)

*Primary Examiner* — Evral E Bodden
(74) *Attorney, Agent, or Firm* — Sprinkle IP Law Group

(57) ABSTRACT

Methods, storage systems and computer program products implement embodiments of the present invention that include deploying, to a computer, a hot-patched method for an original method in a method library that is dynamically loaded by a software application running on the computer, wherein the hot-patched method is configured to intercept requests from the software application to the original method. An upload policy can then be specified. Upon the hot-patched method intercepting a request from the software application to the original method to upload a given file from the computer to an Internet site, a comparison can be made between the intercepted request to the policy. In response to the comparison, the upload can be controlled.

18 Claims, 6 Drawing Sheets

(56) References Cited

U.S. PATENT DOCUMENTS

| | | | |
|---|---|---|---|
| 9,191,381 B1 | 11/2015 | Popp | |
| 9,241,004 B1 | 1/2016 | April | |
| 9,384,345 B2 | 7/2016 | Dixon et al. | |
| 9,576,070 B2 * | 2/2017 | Steiner | G06F 16/9574 |
| 9,635,042 B2 | 4/2017 | Brown et al. | |
| 9,674,145 B2 | 6/2017 | Chien | |
| 10,257,182 B2 | 4/2019 | Child et al. | |
| 10,805,314 B2 | 10/2020 | Jakobsson et al. | |
| 10,904,218 B2 | 1/2021 | Muttik | |
| 11,089,005 B2 | 8/2021 | Ford et al. | |
| 11,178,188 B1 | 11/2021 | Wu et al. | |
| 11,537,706 B1 | 12/2022 | Sharifi Mehr | |
| 11,831,617 B2 * | 11/2023 | Lewin | H04L 63/0281 |
| 11,979,383 B1 | 5/2024 | Litty | |
| 2010/0186088 A1 | 7/2010 | Banerjee et al. | |
| 2010/0250779 A1 | 9/2010 | B'far et al. | |
| 2014/0068733 A1 | 3/2014 | Belsario | |
| 2014/0298403 A1 | 10/2014 | Qureshi | |
| 2015/0067760 A1 | 3/2015 | Waltermann et al. | |
| 2015/0074390 A1 | 3/2015 | Toback et al. | |
| 2015/0123983 A1 | 5/2015 | Schoening | |
| 2015/0304302 A1 | 10/2015 | Zhang | |
| 2017/0126653 A1 | 5/2017 | Lupien | |
| 2017/0264612 A1 | 9/2017 | Kaushal et al. | |
| 2017/0317828 A1 | 11/2017 | Reinhold | |
| 2018/0077138 A1 | 3/2018 | Bansal et al. | |
| 2018/0091453 A1 | 3/2018 | Jakobsson | |
| 2019/0020646 A1 | 1/2019 | Magyar | |
| 2019/0347667 A1 | 11/2019 | Zhang | |
| 2020/0097337 A1 | 3/2020 | Borkar et al. | |
| 2020/0162454 A1 | 5/2020 | Jain et al. | |
| 2020/0213336 A1 | 7/2020 | Yu et al. | |
| 2020/0380115 A1 | 12/2020 | Knight et al. | |
| 2021/0306315 A1 | 9/2021 | Wright et al. | |
| 2021/0400032 A1 | 12/2021 | Ryu | |
| 2023/0078849 A1 | 3/2023 | Seletskiy et al. | |
| 2023/0315835 A1 | 10/2023 | Hangzhou et al. | |
| 2023/0401308 A1 | 12/2023 | Ben Zakai et al. | |
| 2023/0409680 A1 | 12/2023 | Blachman et al. | |
| 2024/0403405 A1 | 12/2024 | Ben Zakai | |
| 2024/0403408 A1 | 12/2024 | Murata | |
| 2025/0021692 A1 | 1/2025 | Bachar et al. | |
| 2025/0053642 A1 | 2/2025 | Ben Zakai | |
| 2025/0184354 A1 | 6/2025 | Edwards et al. | |
| 2025/0307378 A1 | 10/2025 | Kleiner | |

OTHER PUBLICATIONS mozilla.org, "Web APIs—FileReaderSync," mdn web docs, pp. 1-3, years 1998-2024, as downloaded from https://developer.mozilla.org/en-US/docs/Web/API/FileReaderSync.

mozilla.org, "Web APIs—File," mdn web docs, pp. 1-3, years 1998-2024, as downloaded from https://developer.mozilla.org/en-US/docs/Web/API/File.

Wikipedia, "NTFS," pp. 1-27, last edited May 30, 2024.

Microsoft, "Microsoft Information Protection (MIP) SDK—setup and configuration," pp. 1-11, Jan. 30, 2024.

U.S. Appl. No. 17/839,550 Office Action dated Aug. 29, 2024.

Ben Zakai et al., U.S. Appl. No. 18/325,019, filed May 29, 2023.

Stackoverflor, "Configure Silent Authentication in Open ID Connect", pp. 1-2, Aug. 11, 2020, as downloaded from https://stackoverflow.com/questions/63351761/configure-silent-authentication-in-open-id-connect.

Meta, "Silent authentication on session expiration with oAuth2 plugin", p. 1, Jan. 30, 2023, as downloaded from https://meta.discourse.org/t/silent-authentication-on-session-expiration-with-oauth2-plugin/253349.

Chrome Developers, "User identification", pp. 1-10, May 14, 2018, as downloadd from https://developer.chrome.com/docs/apps/app_identity/.

International Application PCT/IB2023/054512 Search Report dated Jul. 30, 2023.

US Non-Final Office Action U.S. Appl. No. 18/617,706, dated Aug. 15, 2025.

US Non Final Office Action U.S. Appl. No. 18/325,019, dated Apr. 9, 2025.

Notice of Allowance for U.S. Appl. No. 18/325,019, mailed Dec. 18, 2025, 6 pgs.

* cited by examiner

94

96 — RECEIVE MESSAGE FROM CLOUD SERVICE INDICATING INSTRUCTION

97 — DOES MESSAGE INCLUDE CONTACT INFO?

YES

NO

98 — LOOK UP CONTACT INFORMATION FOR USER

99 — PROMPT USER FOR INPUT RELATING TO INSTRUCTION

100 — RECEIVE INPUT FROM USER

101 — IS ACTION REQUIRED?

NO

END

YES

102 — COMMUNICATE MESSAGE TO CLOUD SERVICE MODIFYING INSTRUCTION

FILE UPLOAD VALIDATION

CROSS-REFERENCE TO RELATED APPLICATIONS

This application is a continuation-in-part of U.S. patent application Ser. No. 17/839,550, filed Jun. 14, 2022, issued as U.S. Pat. No. 12,277,209, which is incorporated herein by

FIELD OF THE INVENTION

The present invention relates generally to computer security, and particularly to using hot-patched dynamic library methods to validate file upload requests.

BACKGROUND OF THE INVENTION

U.S. Pat. No. 9,384,345 describes methods and systems involving receiving a request for web content from a client computing facility, presenting the web content, and retrieving indicia of a reputation assessment of the web content and delivering the indicia to the client computing facility in coordination with delivery of the web content to the client computing facility.

U.S. Pat. No. 10,805,314 describes a method in which information of an electronic message to be delivered to an intended recipient is received. For an original resource identifier included in the electronic message, a corresponding alternative resource identifier that can be at least in part used to obtain the original resource identifier and obtain context information associated with the electronic message is determined. The original resource identifier included in the electronic message is replaced with the alternative resource identifier to generate a modified electronic message. The modified electronic message with the alternative resource identifier is allowed to be delivered to the intended recipient instead of the electronic message with the original resource identifier. A request made using the alternative resource identifier in the modified message triggers a security action based at least in part on the context information associated with the electronic message.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a set of files, including deploying, to a computer, a hot-patched method for an original method in a method library that is dynamically loaded by a software application running on the computer, wherein the hot-patched method is configured to intercept requests from the software application to the original method, specifying an upload policy, intercepting, by the hot-patched method, a request from the software application to the original method to upload a given file from the computer to an Internet site, making a comparison between the intercepted request to the policy, and controlling the upload in response to the comparison.

In one embodiment, controlling the upload includes canceling the upload when the comparison indicates a violation of the policy.

In another embodiment, controlling the upload includes enabling the upload to proceed when the comparison indicates no violation of the policy.

In an additional embodiment, making the comparison includes analyzing the given file.

In a further embodiment, analyzing the given file includes analyzing the given file to detect if the given file includes specific content.

In a supplemental embodiment, the specific content includes sensitive information.

In some embodiments, analyzing the given file includes analyzing the given file to detect if the given file includes a specific attribute.

In one embodiment, the specific attribute includes a size of the given file.

In another embodiment, the specific attribute includes an identity of a user requesting the upload.

In an additional embodiment, the specific attribute includes a group for a user requesting the upload.

In a further embodiment, the specific attribute includes one or more permissions for the given file.

In a supplemental embodiment, the Internet site includes a first domain, and wherein making the comparison includes comparing the first domain to one or more specified second domains.

In one embodiment, the Internet site includes a first Internet Protocol (IP) address, and wherein making the comparison includes comparing the first IP address to one or more specified second IP addresses.

In another embodiment, the Internet site has an associated first category, and wherein making the comparison includes comparing the first category to one or more specified second categories.

In an additional embodiment, the software application includes browser-executable code that can be executed by a web browser.

In some embodiments, the browser-executable code includes first browser-executable code that generates a web page element including second browser-executable code, and wherein intercepting the request from the software application includes intercepting the request from the second browser-executable code.

There is also provided, in accordance with an embodiment of the present invention, an apparatus for protecting a set of files, including a memory, and a processor configured to deploy, to the memory, a hot-patched method for an original method in a method library that is dynamically loaded by a software application running on the computer, wherein the hot-patched method is configured to intercept requests from the software application to the original method, to specify an upload policy, to intercept, by the hot-patched method, a request from the software application to the original method to upload a given file from the computer to an Internet site, to make a comparison between the intercepted request to the policy, and to control the upload in response to the comparison.

There is additionally provided, in accordance with an embodiment of the present invention, a computer software product for protecting a set of files, the computer software product including a non-transitory computer-readable medium, in which program instructions are stored, which instructions, when read by a computer, cause the computer to deploy, to a computer, a hot-patched method for an original method in a method library that is dynamically loaded by a software application running on the computer, wherein the hot-patched method is configured to intercept requests from the software application to the original method, to specify an upload policy, to intercept, by the hot-patched method, a request from the software application to the original method to upload a given file from the computer to an Internet site, to make a comparison between the intercepted request to the policy, and to control the upload in response to the comparison.

BRIEF DESCRIPTION OF THE DRAWINGS

The disclosure is herein described, by way of example only, with reference to the accompanying drawings, wherein.

DETAILED DESCRIPTION OF EMBODIMENTS

An organization may define computer-usage rules regulating the activities performed by users associated with the organization. For example, the rules may specify types of content to which the organization does not allow access, or types of websites to which the organization does not allow credentials or other sensitive information to be posted. Alternatively or additionally, the rules may regulate the sharing of sensitive data. For example, the rules may specify the conditions under which sensitive files may be shared.

However, it is often difficult for users to act in accordance with such rules. For example, upon encountering a phishing website (e.g., via a link in an email), a user may enter his credentials, due to erroneously thinking that the website is legitimate. As another example, a user may upload a file to a file-sharing website, forgetting that, due to the file containing sensitive information, the file should be shared only with certain users and/or only with a suitably close expiration date, such that the file cannot be downloaded beyond the expiration date.

To address this challenge, embodiments of the present invention provide a server configured to provide auxiliary code for implementing a process for facilitating enforcement of one or more computer-usage rules, and to augment third-party code with the auxiliary code. For example, the auxiliary code may be injected into a Hypertext Transfer Protocol (HTTP) response or added as an extension to an application. When the auxiliary code is executed by the user's computer, the user may be notified of the relevant computer-usage rules and/or inhibited from performing activities that may contravene the rules. For example, execution of the code may cause input fields on a website to be disabled, and/or links or other content on the website to be hidden or modified. As another example, execution of the code may cause an expiration date to be automatically associated with a file that was uploaded, by the user, to a file-sharing website.

As described hereinbelow, a hot-patched method for an original method in a method library that is dynamically loaded by a software application running on a computer is deployed to the computer, wherein the hot-patched method is configured to intercept requests from the software application to the original method. To complete the configuration, an upload policy is specified. Upon intercepting, by the hot-patched method, a request from the software application to the original method to upload a given file from the computer to an Internet site, a comparison is made between the intercepted request to the policy. Finally, in response to the comparison, the upload can be controlled. For example, the upload can be allowed if the intercepted request complies with the policy, and the upload can be canceled if the intercepted request does not comply with the policy.

System Description

Figure 1:
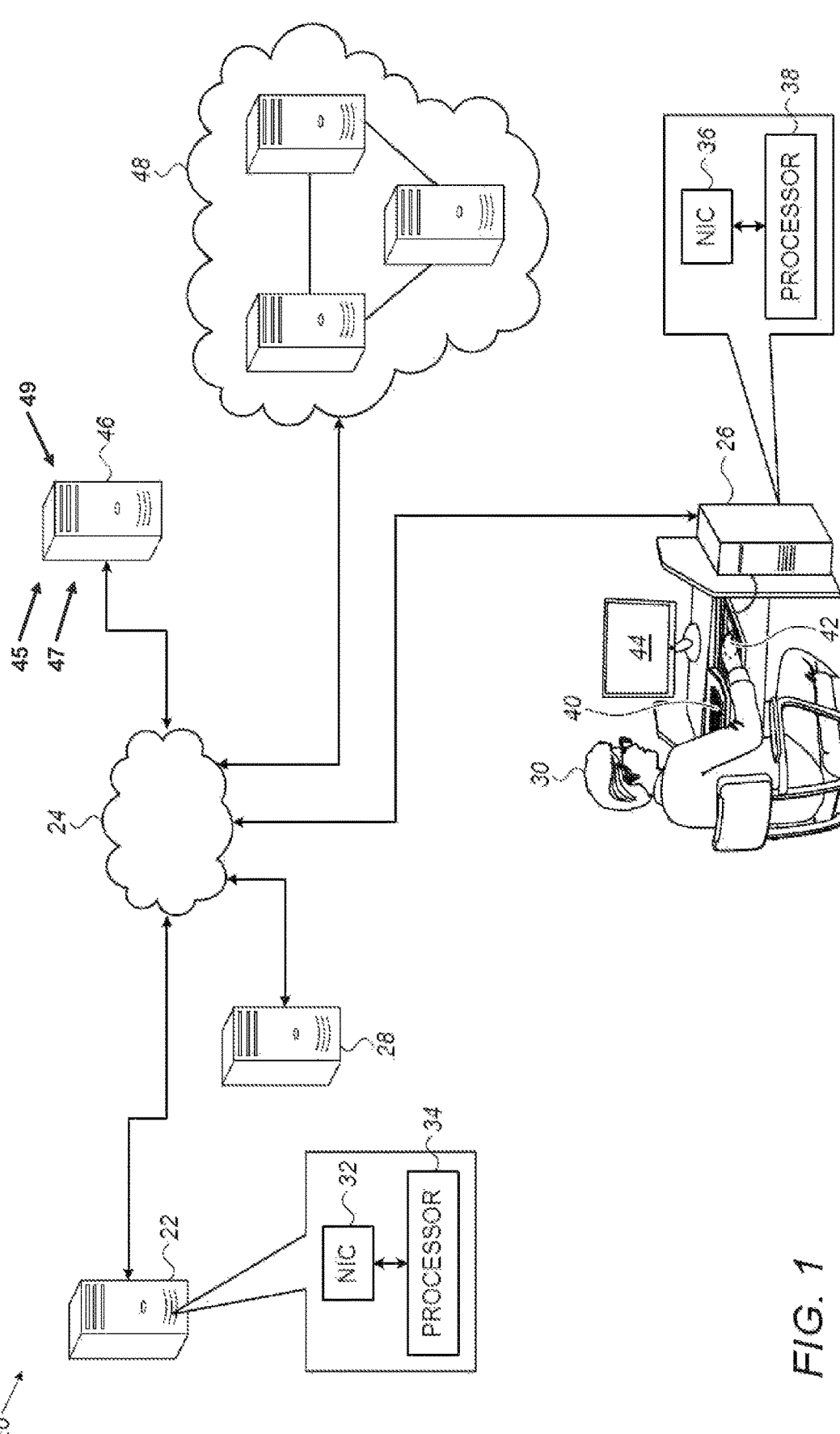
FIG. 1 is a schematic illustration of a system for security orchestration, in accordance with some embodiments of the present invention.

Reference is initially made to FIG. 1, which is a schematic illustration of a system 20 for security orchestration, in accordance with some embodiments of the present invention.

System 20 comprises at least one server 22 comprising a communication interface 32, such as a network interface controller (NIC), and a processor 34. Via communication interface 32, processor 34 exchanges communication over a computer network 24, such as the Internet. In embodiments herein, computer network 24 may also be referred to as Internet 24 (i.e., a public data network).

FIG. 1 depicts a user 30 using a computer 26, which may comprise, for example, a desktop computer, a laptop computer, a tablet computer, or a smartphone. Computer 26 comprises a communication interface 36, such as a NIC, a processor 38, and one or more input/output (I/O) interfaces such as a keyboard 40, a mouse 42, or a display 44. Computer 26 may belong to another network, such as a local area network (LAN), that is separate from network 24.

Processor 38 is configured to execute various applications on computer 26, and user 30 may interact with the applications via the I/O interfaces.

For example, processor 38 may execute an email application. The email application may retrieve emails over network 24, via communication interface 36, from an email server 28, and display the emails on display 44. Example email applications include Microsoft Outlook and Gmail by Google.

As another example, processor 38 may execute a web browser.

The web browser may retrieve content over network 24, via communication interface 36, from a web server 46, and display the content on display 44. Example web browsers include MOZILLA FIREFOX™, MICROSOFT EDGE™, and GOOGLE CHROME™. In embodiments described herein, web server 46 can host an Internet site 45 having a domain 47 and an Internet Protocol (IP) address 49.

As another example, processor 38 may execute any application configured to communicate over network 24, via communication interface 36, with a cloud service 48. Examples of such applications include file-sharing applications (e.g., Dropbox) and instant-messaging applications (e.g., Slack). It is noted that cloud service 48 may be provided by a single server, or by multiple interconnected servers as shown in FIG. 1. It is further noted that email server 28, or a plurality of interconnected email servers, may provide a cloud service.

One or more computer-usage rules regulate the actions performed by user 30 on computer 26. For example, user 30 may be associated with an organization (such as a school or a workplace) for which the computer-usage rules have been defined.

For example, the computer-usage rules may regulate sharing of information by user 30. For example, the rules may prohibit the user from entering his credentials or other sensitive information on certain websites. Alternatively or additionally, the rules may prohibit the user from communicating sensitive files over network 24, or may require that any such communication is encrypted and/or is reported to a compliance department. As a specific example, the user may be allowed to download files from a file-sharing website, but not to upload files to the website.

As another example, the computer-usage rules may restrict the content that user 30 is allowed to access. For example, the user may be prohibited from accessing certain websites.

As yet another example, the computer-usage rules may restrict accepting certain Open Authentication (OAuth) permissions, alternatively referred to as "scopes."

As described in detail below, processor 34 is configured to provide auxiliary code implementing a process for facilitating enforcement of the computer-usage rules, and to augment third-party code (i.e., code that is not provided by server 22, but rather, is provided by any other party) with the auxiliary code such that execution of the third-party code carries out the process. Typically, the process includes an interaction with the user, whereby the user is asked to input information relevant to the rules.

In some embodiments, the auxiliary code implements the process via the application that is defined or controlled by the third-party code. For example, as described below with reference to FIG. 2, the third-party code may include HTML and/or JavaScript that controls the content displayed on a web browser, and the auxiliary code may implement an interaction with the user via a dialog window displayed on the web browser. As another example, the third-party code may define an instant-messaging application, and the auxiliary code may implement an interaction with the user via the instant-messaging application.

In other embodiments, the auxiliary code implements the process via a different application. For example, upon execution of the third-party code and auxiliary code by computer 26, the user may receive a phone call or text message reminding the user of the computer-usage rules and/or querying the user for input relating to the execution.

In some embodiments, the auxiliary code causes computer 26 to open a communication channel (e.g., a WebSocket) with the server. The auxiliary code may then exchange communication with the server, over the communication channel, when implementing the process. For example, as described below with reference to FIG. 2, the auxiliary code may submit input to a machine-learned algorithm executed on the server, and receive output from the algorithm. As another example, the auxiliary code may retrieve the latest version of the computer-usage rules from the server.

In general, each of the processors described herein may be embodied as a single processor, or as a cooperatively networked or clustered set of processors. The functionality of any one of the processors may be implemented solely in hardware, e.g., using one or more fixed-function or generalpurpose integrated circuits, Application-Specific Integrated Circuits (ASICs), and/or Field-Programmable Gate Arrays (FPGAs). Alternatively, this functionality may be implemented at least partly in software. For example, any one of the processors described herein may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Facilitating Enforcement of Computer-Usage Rules

Figure 2:
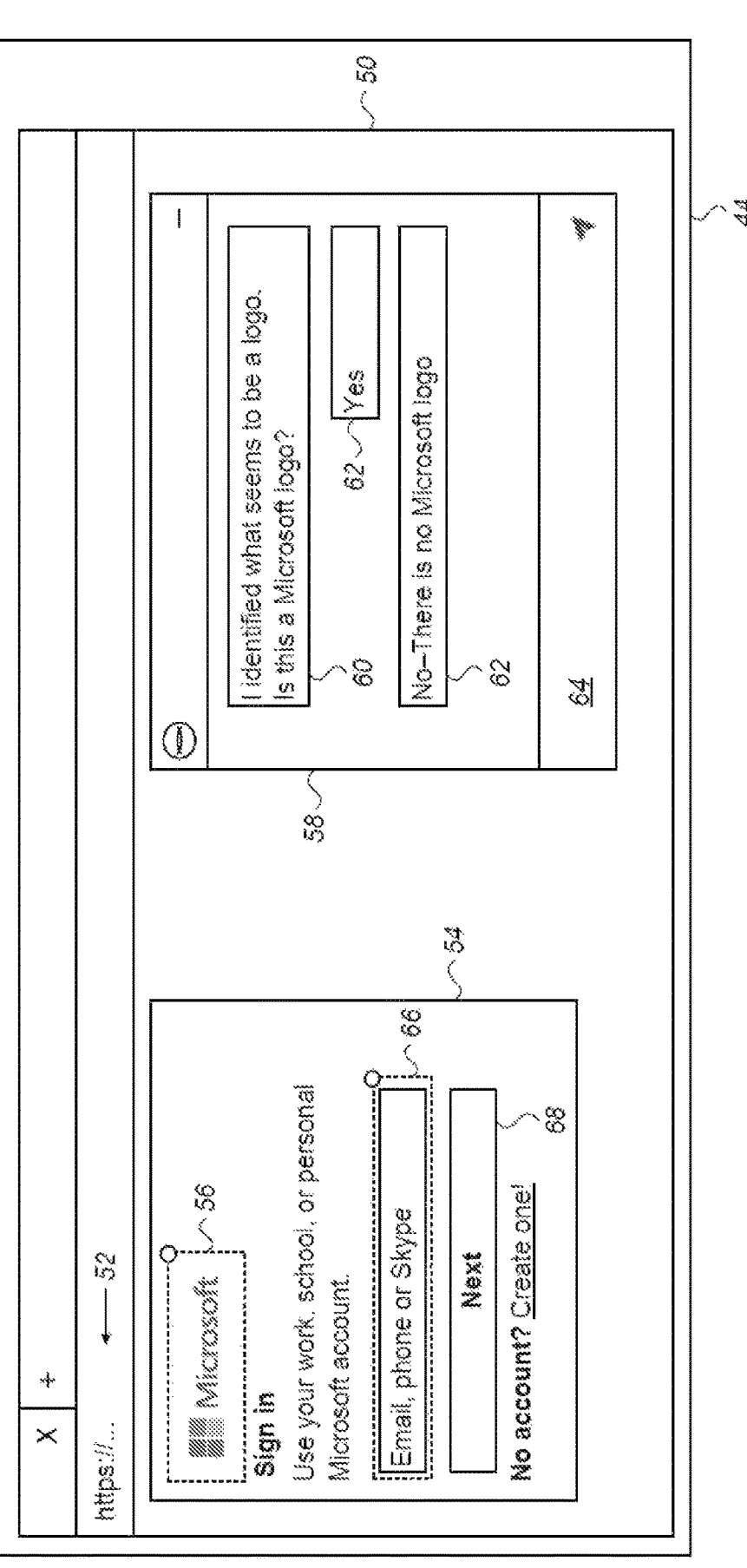
FIG. 2 is a schematic illustration of an augmented website, in accordance with some embodiments of the present invention.

Reference is now made to FIG. 2, which is a schematic illustration of an augmented website, in accordance with some embodiments of the present invention.

In some embodiments, the auxiliary code implements a process for prompting the user for input relating to the execution of the third-party code and facilitating enforcement of the computer-usage rules based on the input.

For example, FIG. 2 depicts a scenario in which display 44 displays a web-browser window 50. The web browser is pointing to a particular Uniform Resource Locator (URL) 52 at which a webpage including a sign-in form 54 is located.

In such a scenario, the auxiliary code may cause the web browser to display a dialog window 58 that prompts the user for input relating to sign-in form 54. For example, dialog window 58 may display a question 60 regarding the sign-in form. The user may answer question 60 by clicking on a button 62 and/or inputting text into an input field 64. Any number of subsequent questions may then be asked.

Based on the input provided by the user, the auxiliary code may facilitate enforcement of the computer-usage rules by warning the user that sign-in form 54 may not be legitimate, and/or preventing the user from entering information on the sign-in form.

For example, the auxiliary code, by calling a logo-identifying routine (executed, for example, on server 22 (FIG. 1)), may identify a logo 56 contained in the sign-in form. In response thereto, the auxiliary code may check whether URL 52 belongs to a domain associated with logo 56. For example, for a Microsoft logo, the auxiliary code may check whether URL 52 belongs to the Microsoft domain. If not, the auxiliary code may ask the user whether the webpage indeed shows the identified logo. If the user confirms that the identified logo is shown, dialog window 58 may warn the user that sign-in form 54 is likely illegitimate.

For cases in which execution of the third-party code renders a webpage as in FIG. 2, the process implemented by the auxiliary code may include modifying the webpage prior to the rendering of the webpage. Advantageously, by virtue of the modifications being performed by the auxiliary code as the auxiliary code is executed by the browser, even dynamically-rendered webpages may be modified.

For example, as described above, execution of the third-party code may cause dialog window 58 to be added to the webpage. Alternatively or additionally, input fields or buttons on the webpage may be disabled, content on the webpage may be obfuscated, and/or links on the webpage may be modified, so as to facilitate enforcing the computer-usage rules. Subsequently, in response to input from the user, the modifications may be undone.

For example, supposing that sign-in form 54 includes an input field 66 for entering an account identifier and a button 68 for submitting the identifier, the auxiliary code may cause input field 66 and/or button 68 to be disabled. Subsequently, if the auxiliary code confirms, based on the user's input, that the logo shown above the input field does not match the URL, the input field and/or button may remain disabled. Otherwise, the input field and/or button may be reenabled.

In some cases, the auxiliary code causes the user's input (entered, for example, via dialog window 58) to be passed to a machine-learned algorithm, which may be executed, for example, on server 22 (FIG. 1). Subsequently, enforcement of the computer-usage rules may be facilitated based on an output of the algorithm.

For example, a machine-learned algorithm may be trained to identify a website as a phishing website based on various parameters, including an input from the user indicating the urgency with which a request for sensitive information is presented on the website. In such a case, dialog window 58 may prompt the user for an input indicating the urgency, e.g., by asking the user to rank the urgency on a numerical scale. Subsequently to the algorithm receiving the user's input, the algorithm may output a likelihood of phishing. If the likelihood exceeds a predefined threshold, the user may be warned, and/or input fields on the website may be disabled.

In other embodiments, the auxiliary code, when executed, notifies the user of the computer-usage rules and/or enforces the rules even without any input from the user. For example, in the scenario depicted in FIG. 2, following the disabling of input field 66 and button 68, dialog window 58 may simply remind the user that his credentials should not be entered into sites that are potentially malicious.

Augmentation to HTTP Responses

In some embodiments, processor 34 (FIG. 1) receives an HTTP response designated for computer 26, augments third-party code contained in the response (e.g., so as to modify a webpage as illustrated in FIG. 2), and then sends the augmented response to the computer. Thus, advantageously, even if the user accesses a website that was not previously known to the organization, the computer-usage rules may be enforced with respect to usage of the website.

To facilitate receiving the HTTP response, server 22 (FIG. 1) may act as a proxy for computer 26, such that all communication between the computer and network 24 passes through server 22. For example, server 22 may act as a cloud proxy for a network to which computer 26 belongs, such that all communication between the network and network 24 passes through the server.

Figure 3:
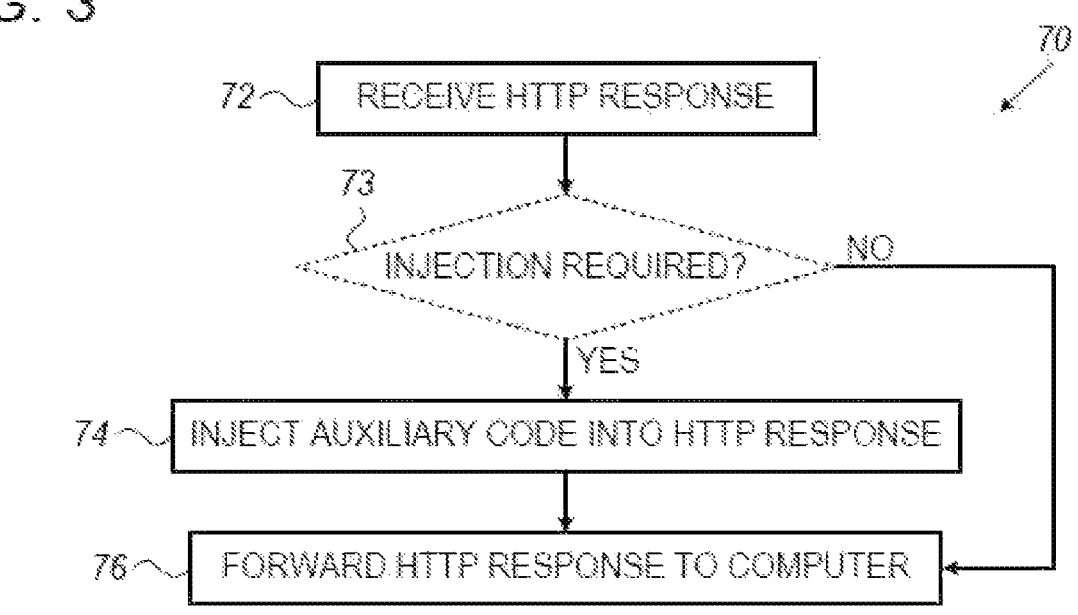
FIG. 3 is a flow diagram for an algorithm for augmenting third-party code contained in a Hypertext Transfer Protocol (HTTP) response, in accordance with some embodiments of the present invention.

For further details regarding HTTP injections, reference is now made to FIG. 3, which is a flow diagram for an algorithm 70 for augmenting third-party code contained in an HTTP response, in accordance with some embodiments of the present invention.

Algorithm 70 begins with a response-receiving step 72, at which the processor receives the HTTP response. Subsequently, the processor, at an optional assessing step 73, may assess whether an injection into the HTTP response is required. For example, the processor may query any suitable online source for the reputation of the website from which the HTTP response was received. If the website does not have a safe reputation and the HTTP response contains code (including, for example, HTML and/or JavaScript) defining a webpage, the processor may decide that an injection is required.

If an injection is required, the processor, at a code-injecting step 74, augments the third-party code in the HTTP response by injecting auxiliary code into the HTTP response. For example, the processor may inject a function (e.g., a JavaScript or TypeScript function) that displays an interactive dialog window on the webpage, e.g., as described above with reference to FIG. 2.

Subsequently, or if no injection is required, the processor forwards the HTTP response to computer 26 (FIG. 1) at a response-forwarding step 76.

Alternatively or additionally to injecting the auxiliary code, the processor may make other modifications to the HTTP response prior to response-forwarding step 76. For example, the processor may modify static links and/or disable static fields defined in the response. If the HTTP response contains a file (rather than code defining a webpage), the processor may remove the file.

Augmentation by Application Extension

In some embodiments, the third-party code defines an application, and the auxiliary code defines an extension to the application, the extension being configured to execute a process for facilitating enforcement of one or more computer-usage rules.

For example, processor 34 (FIG. 1) may augment code defining a web browser on computer 26 with auxiliary code defining an extension to the web browser. (In other words, the processor may, via network interface 32, install the browser extension on computer 26.) The extension may display, and execute the functionality of, dialog window 58, as described above with reference to FIG. 2. Alternatively or additionally, the extension may make other modifications to webpages loaded in the browser, such as by disabling input fields.

For example, the extension may be configured to inject, into any HTTP response received by the browser, additional auxiliary code configured to display and execute the functionality of dialog window 58 and/or make other modifications to the webpage defined in the HTTP response. As described above with reference to FIG. 1, the additional auxiliary code may be configured to communicate with server 22, such that the additional auxiliary code may execute this functionality in response to output from any algorithms (e.g., machine-learned algorithms) executed on the server.

As another example, the processor may augment code defining an online-communication (e.g., videoconferencing) application on the computer with auxiliary code defining an extension to the online-communication application. The extension may notify the user of the computer-usage rules, and/or collect input from the user, via a dedicated dialog window (similar to dialog window 58 of FIG. 2) or via a preexisting chat facility belonging to the application. Thus, for example, the extension may notify the user that, per the computer-usage rules, the user's video conference should be recorded. Alternatively or additionally, if the user instructs the application to share a file with another user, the extension may ask the user for input regarding the content of the file, and then allow or disallow the sharing of the file in response to the input.

As yet another example, the processor may augment code defining an email application with auxiliary code defining an extension to the email application. Prior to the email application displaying an email, the extension may modify the email, e.g., by obfuscating content, modifying links, and/or removing attachments. Alternatively or additionally, the extension may query the user (e.g., via a dedicated dialog window) for input regarding the email. For example, the extension may ask the user if the user recognizes the sender of the email and/or whether a request for information contained in the email is written with an urgent tone. Subsequently, responsively to the input, the extension may retain or undo any modifications that were made to the email, and/or notify the user of the relevant rules.

Security Orchestration for Cloud Services

Figure 4:
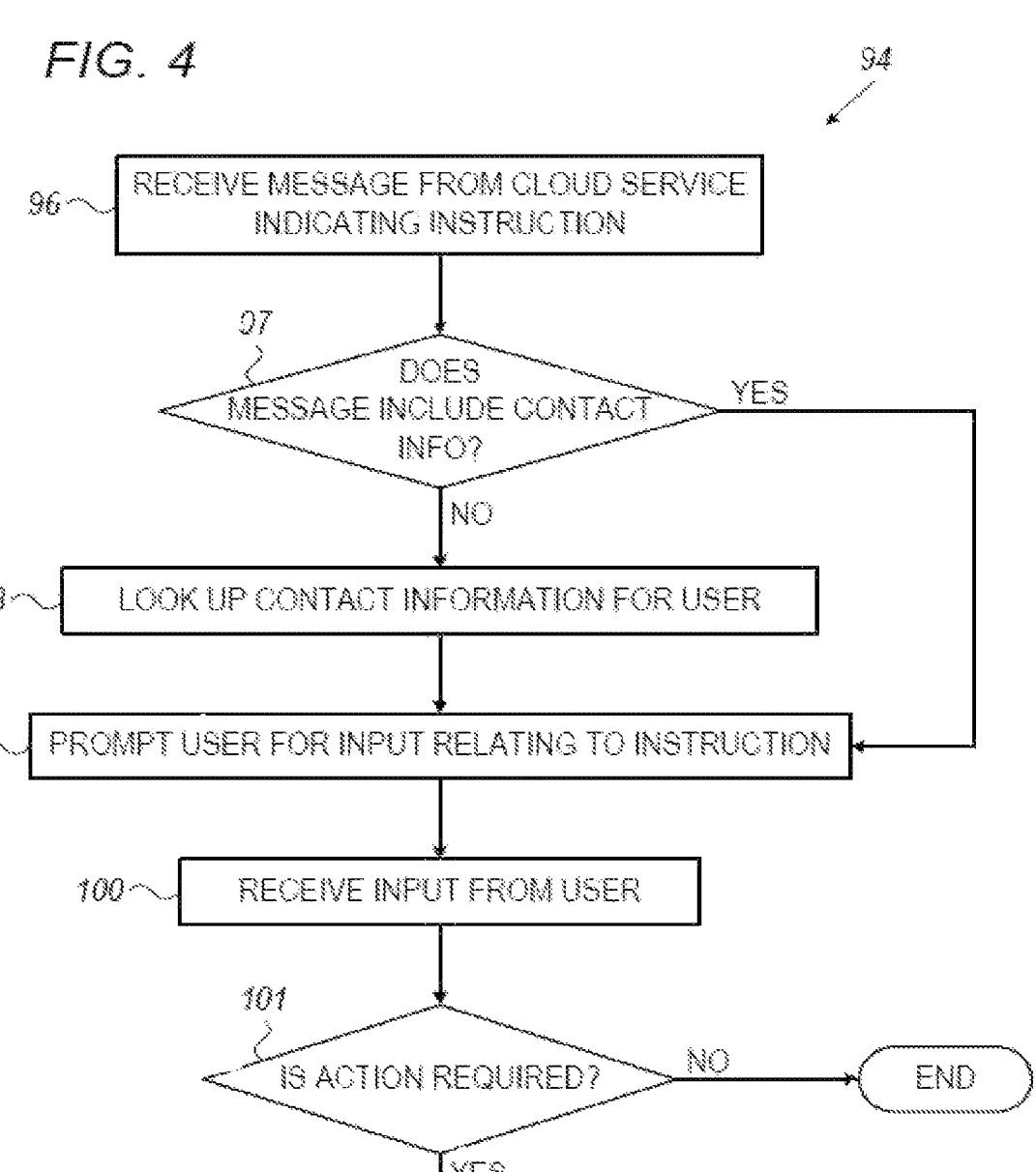
FIG. 4 is a flow diagram for an algorithm for security orchestration for cloud services, in accordance with some embodiments of the present invention.

Reference is now made to FIG. 4, which is a flow diagram for an algorithm 94 for security orchestration for cloud services, in accordance with some embodiments of the present invention. Algorithm 94 may be executed by processor 34 (FIG. 1) so as to facilitate enforcement of one or more computer-usage rules with respect to instructions communicated from computer 26 to cloud service 48. To facilitate the performance of algorithm 94, server 22 may be connected to an API for the cloud service.

Algorithm 94 begins at a message-receiving step 96, at which the processor receives, from the cloud service, a message indicating an instruction from computer 26 to the cloud service. In response to receiving the message, the processor checks, at a checking step 97, whether the message includes contact information for user 30 (FIG. 1), i.e., any identifier that can be used to contact the user.

For example, if the user logged in to the cloud service using his email address, the message may include the email address, which may be used to contact the user via email. As another example, if the user accessed the cloud service via a single sign-on (SSO) directory service, the message may include the username under which the user logged in to the directory service. This username may be used to contact the user via an application running on the computer, as further described below.

If the message does not include any contact information for the user, the processor, at a lookup step 98, looks up contact information for the user based on an identifier contained in the message. For example, given the user's username, the processor may look up (in an organization-wide directory, for example) contact information, such as an email address or phone number, associated with the username.

Subsequently to looking up the contact information, or if no lookup is required, the processor, at a prompting step 99, prompts the user for input relating to the instruction.

For example, if the contact information includes an email address or a phone number, the processor may prompt the user via an email, a text message, or a phone call. For cases in which the processor prompts the user via an email or a text message, the email or text message may contain a link to a website at which the input may be submitted; alternatively, the input may be submitted via a return email or text message. For cases in which the processor prompts the user via a phone call, the user may submit the input by pressing on the appropriate phone keys.

As another example, if the contact information includes a username, such as an SSO username, of the user, the processor may prompt the user via a messaging application (e.g., Slack) in which the user is identified by the username. The user may then submit the input via the application.

Alternatively, the processor may ascertain, based on the username, that the user is logged in to computer 26. In response thereto, the processor may prompt the user via an application running on the computer. For example, an extension to a browser, which is in communication with the server over a communication channel (e.g., a WebSocket), may run on computer 26. In response to ascertaining that the user is logged in to computer 26, the processor may prompt the user by instructing the browser, via the communication channel, to display the prompt. The user may then submit the input via the browser.

Subsequently, at an input-receiving step 100, the processor receives the input from the user. Next, based on the input, the processor decides, at a deciding step 101, whether action is required to facilitate enforcement of one or more computer-usage rules with respect to the instruction. If yes, the processor performs the required action. For example, the processor may, at a message-communicating step 102, communicate another message, which modifies the instruction (i.e., contains a new instruction causing a result different from the intended result of the original instruction), to the cloud service.

Alternatively or additionally, the processor may notify the user of the computer-usage rules. For example, if the input was submitted via a website as described above, the website may display the rules. If the input was submitted via phone, the rules may be conveyed auditorily over the phone.

For example, if the message received at message-receiving step 96 indicates an instruction to a file-sharing service to upload a file, the processor may prompt the user for information regarding the content of the file and/or the identity of the other users with whom the file is being shared. If, based on the user's input, the processor ascertains that, per the computer-usage rules, the file should not be shared, the processor may communicate another message to the cloud service, instructing the service to reject the upload or to erase the file following the upload. Alternatively, if the rules require that the file be encrypted, the processor may instruct the service to communicate the file to the processor, and the processor may then encrypt the file before returning the file to the service. Alternatively or additionally to encrypting the file, the processor may instruct the service to place an expiration date on the file in accordance with the rules. Alternatively or additionally, the processor may notify the user that sensitive files may be shared only with certain other users, only if encrypted, and/or only with a suitably close expiration date.

Similarly, for a code-repository cloud service, the processor may prompt the user for information regarding the code that the user is uploading. Based on the user's input, the processor may instruct the service to reject the upload, erase the code following the upload, or communicate the code to the processor (e.g., so that the processor may encrypt the code before returning the code to the service). Alternatively or additionally, the processor may notify the user of the relevant computer-usage rules pertaining to the uploading of code.

Similarly, if the initial message indicates an instruction to an instant-messaging service to upload content, the processor may prompt the user (e.g., via the same instant-messaging application) for information regarding the content and/or the identity of the other users with whom the content is being shared. If, based on the user's input, the processor ascertains that, per the computer-usage rules, the content should not be shared, the processor may communicate another message to the cloud service, instructing the service to reject the upload, erase the content following the upload, or communicate the content to the processor. Alternatively or additionally, the processor may notify the user (e.g., via the same instant-messaging application) of the relevant computer-usage rules.

File Upload Request Validation

In some embodiments, as described supra, auxiliary code can be added as an extension to an application so as to facilitate enforcement of one or more computer-usage rules. In one embodiment, the auxiliary code can specify and enforce conditions under which sensitive files may be shared. For example (as described supra), this embodiment can be used to detect user 30 attempting to a file to a file-sharing website (i.e., a given Internet site 45), forgetting that, due to the file containing sensitive information, the file should be shared only with certain users and/or only with a suitably close expiration date, such that the file cannot be downloaded beyond the expiration date.

Figure 5:
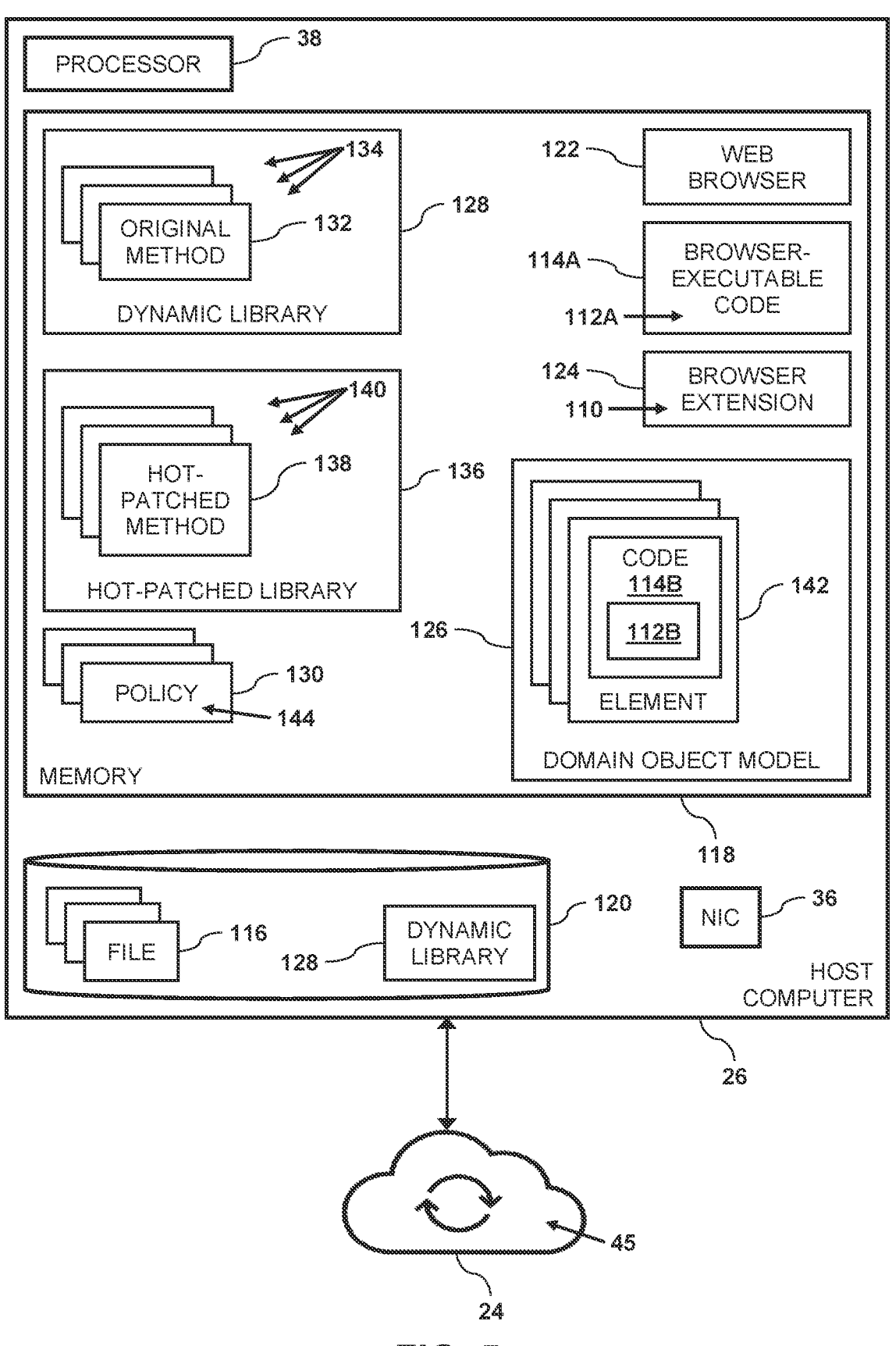
FIG. 5 is a block diagram showing a configuration of a computer that can use hot-patched methods for controlling an upload of a file to an Internet site, in accordance with an embodiment of the present invention.

FIG. 5 is a block diagram that shows hardware and software components of computer 26 comprising processor 38 that can be configured to execute auxiliary code 110 so as to intercept and validate requests 112 from browser-executable code 114 to upload a given file 116 to Internet site 45, in accordance with an embodiment of the present invention. In addition to processor 38 and NIC 36, computer 26 may comprise a memory 118 and a storage device 120 that can store one or more files 116.

While the configuration in FIG. 5 shows computer 26 comprising storage device 120 storing one or more files 116, other configurations are considered to be within the spirit and scope of the present invention. For example, storage device 120 may be coupled to processor 38 via network 24.

In embodiments described herein, browser-executable code 114 and requests 112 can be differentiated by appending a letter to the identifying numeral, so that the browser-executable code comprises of browser-executable code 114A and 114B, and the requests comprise requests 112A and 112B.

In addition to storing browser-executable code 114A, memory 118 can store a web browser 122 (e.g., GOOGLE CHROME™ as described supra), a browser extension 124, a domain object model 126, a dynamic library 128, and one or more policies 130. Examples of browser-executable code include, but are not limited to JavaScript code, HyperText Markup Language (HTML) code and Cascading Style Sheet (CSS) code. In some embodiments, processor 38 can download browser extension 124 from server 20 or 22 upon initiating execution of web browser 122.

In some embodiments, storage device 120 may store dynamic library 128, and processor 38 can load, from the storage device 120, the dynamic library to memory 118 upon initiating execution of browser-executable code 114A. Dynamic library 128 comprises a set of original methods 132 having respective method names 134. For example, dynamic library 128 may comprise a JavaScript library that can be accessible via an application programming interface (API) for web browser 122 (e.g., the public API for CHROME™).

Upon processor 38 executing web browser 122, the web browser can load and execute web browser extension 110. In some embodiments, web browser extension comprises auxiliary code 110 that can inject [,] into memory 118, a hot-patched library 136 that comprises a set of hot-patched methods 138 having respective method names 140. In embodiments described herein, each given hot-patched method 138 has a corresponding original method 132, wherein method name 134 for the given hot-patched method matches method name 140 for the corresponding hot-patched method.

To generate a given hot-patched method 138, a software developer (not shown) can hot-patch (also known as monkey patching) the corresponding original method 132 so that the given hot-patched method will take precedence over the corresponding original method when browser-executable code 114 generates a given request 112 for the corresponding original method. A given hot-patched method 138 and its corresponding original method 132 have identical names 134 and 136. For example if method names 134 and 136 are both M1, then if browser-executable code calls M1, processor 38 will forward the call to the given hot-patched method (i.e., due to the precedence). Hot-patched methods 138 are also known as interposed methods.

Hot-patching involves dynamically replacing or extending the behavior of a method (or a function, class, or module) at runtime. For example, if web browser 122 is CHROME™, then upon hot-patching one or more methods 132, processor 38 can register the hot-patched methods (i.e., so that they take precedence) by executing the following code:

```
chrome.scripting.registerContentScripts(scripts:  Regis-
    teredContentScript[ ], callback?: function,
)
```

In this code example, scripts comprises an array of hot-patched methods 138.

In a first hot-patch embodiment, hot-patched methods 138 may corresponding to original methods 36 called by browser-executable code 114A in requests 112A. Examples of hot-patched methods 138 in this embodiment include, but are not limited to:

```
EventTarget.prototype.addEventListener
EventTarget.prototype.removeEventListener
HTMLElement.protpotype ondrop property
HTMLElement.prototype ondragleave property
```

When executing browser-executable code 114A, browser-executable code 114A may generate a set of web page (e.g., HTML) elements 142 in DOM 126, wherein one or more of the elements may comprise browser-executable code 114B that can respectively generate requests 112B that a given hot-patched method 138 can intercept using embodiments described herein.

In a second hot-patch embodiment, hot-patched methods 138 may correspond to original methods 36 called by browser-executable code 114B in requests 112B. Examples of hot-patched methods 138 in this embodiment include, but are not limited to:

```
Document.prototype.createElement
Object innerHTML property
Document.prototype.write—overwrite old doc—iframe
Document.prototype.writeln
Node.prototype.cloneNode
Element.prototype.insertAdjacentHTML
```

As described supra, processor 38 can implement computer-usage rules 144 so as to regulate sharing of information by user 30. In some embodiments, processor 38 can deploy rules 144 as policies 130, wherein each given policy 130 comprises one or more rules 144 that regulates sharing of files 116 to Internet sites 45. Examples of policies 130 include but are not limited to:

Analyze a given file 116 so as to determine whether or not the given file comprises specific contents. For example, a given policy can restrict uploading a given file to any Internet site 45 if the given file comprises sensitive information.

Analyze a given file 116 so as to determine whether or not the given file comprises specific attribute, and processor 38 can restrict uploading the given file based on the specific attribute. such as a size of the given file (e.g., the processor can restrict uploading the given file if the size exceeds a specified threshold), an id of user 30, a group for user 30 (e.g., a department such as marketing or accounting), or permissions (not shown) for the given file). In these embodiments, user 30 requested (i.e., via web browser 122) uploading the given file.

Restricting, in response to processor 38 comparing domain 47 to one or more specified domains, uploading any given file 116 to Internet site 45 if domain 47 matches a given specified domain.

Restricting, in response to processor 38 comparing IP address 49 to one or more specified IP addresses, uploading any given file 116 to Internet site 45 IP address 49 matches a given specified IP address. In some embodiments, the one or more specified IP addresses may comprise a range of IP addresses.

In embodiments where Internet site 45 can be categorized (i.e., have an associated category such as social media, sports, news) a given policy 130 can restrict, in response to processor 38 comparing the category of the Internet site to one or more specified categories, uploading any given file 116 to Internet site 45 the category of Internet site 45 matches a given specified category.

In an additional processor 38 can be configured to receive, from user 30, an input defining one or more rules 144 and/or one or more policies 130.

Examples of memory 118 include dynamic random-access memories and non-volatile random-access memories. Storage device 120 may comprise a non-volatile storage device such as a hard disk drive and/or a solid-state disk drive.

Figure 6:
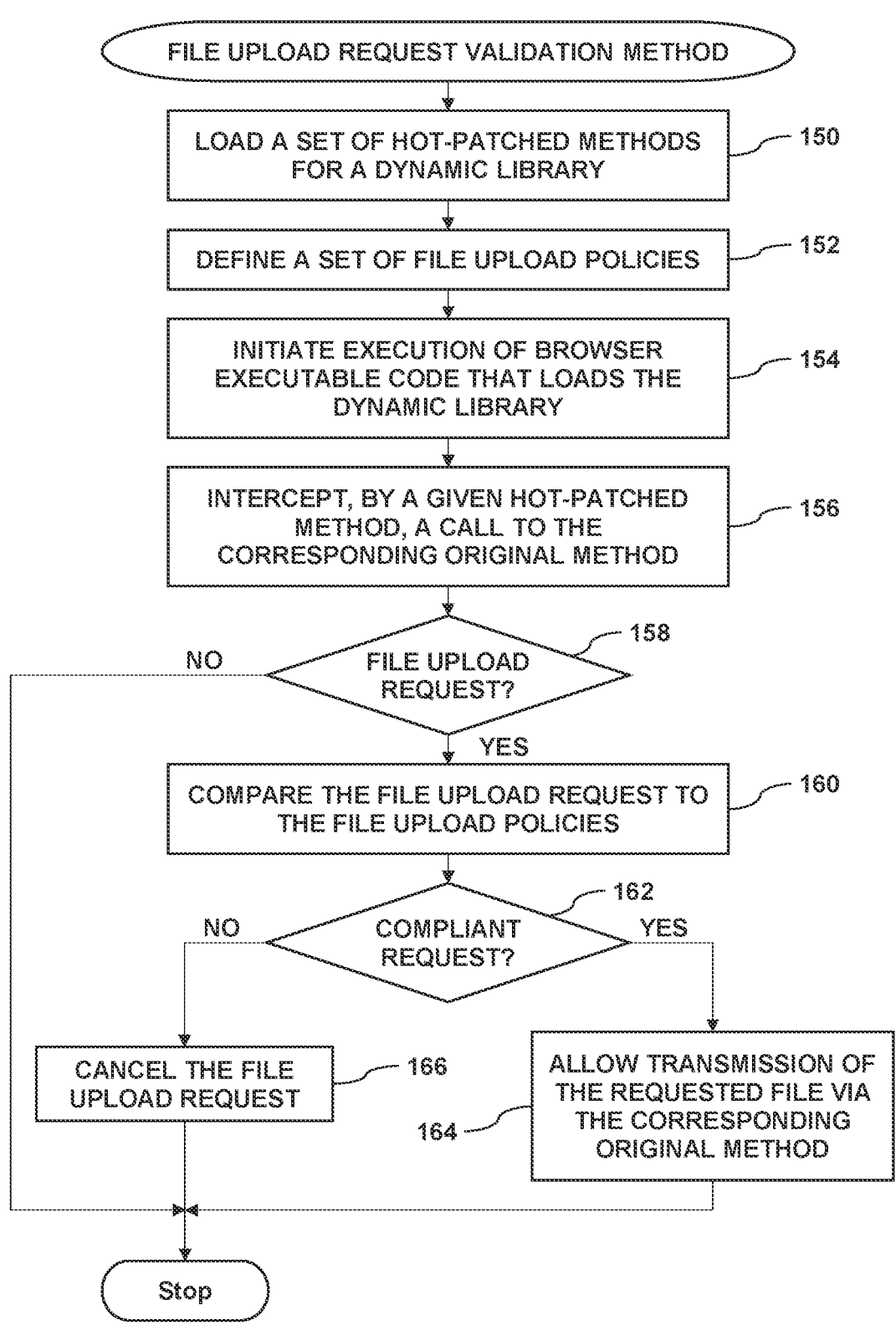
FIG. 6 is a flow diagram that schematically illustrates a method in which a given hot-patched method controls the upload of a file to an Internet site, in accordance with an embodiment of the present invention.

FIG. 6 is a flow diagram that schematically illustrates a method in which a given hot-patched method 138 controls the upload of a given file 116 to Internet site 45, in accordance with an embodiment of the present invention.

In step 150, processor 38 loads hot-patched library 136 comprising a set of one or more hot-patched methods 138. As described supra, this can be implemented by web browser 122 (executing on processor 38) loading browser extension 124, and auxiliary code 110 in the browser extension injecting (i.e., loading) hot-patched library 136 to memory 118.

In step 152, processor 38 loads policies 130. As described supra, each policy 130 may comprise one or more rules 144.

In step 154, in response to initiating execution of browser-executable code 114A, processor 38 loads dynamic library 128.

In step 156, while executing browser-executable code 114, a given hot-patched method 138 intercepts a call to a given original method 132. As described supra, since processor 38 interposes hot-patched methods 138 between browser-executable code 114 and original methods 132, upon browser-executable code 114 calling a given original method 132, the corresponding hot-patched method 138 intercepts the call.

In step 158, processor 38 analyzes the intercepted call so as to determine whether or not the intercepted call comprises a given request 112 to upload (i.e., transmit) a given file 116 to Internet site 45. An example of a given request 112 to upload a given file 116 to Internet site 45 comprises the EventTarget.prototype.addEventListener method that registers an ondrop event, where user 30 "drops" the given file on Internet site 45.

If the intercepted call comprises a given request 112 to upload a given file 116 to Internet site 45, then in step 160, processor 38 compares the intercepted request (i.e., features in the intercepted request, e.g., domain 47) to policies 130.

In step 162, if the intercepted request is compliant with policies 130 (i.e., there was no violation of any policy 70), then in step 164, the given hot-patched method controls the requested upload by allowing the uploading of the given file 116 to Internet site 45, and the method ends. In some embodiments, the given hot-patched method can allow uploading of the given file 116 to Internet site 45 by forwarding the intercepted request to the original method corresponding to the given hot-patched method.

Returning to step 162, if the intercepted request is not compliant with any given policy 130 (i.e., there was a violation of at least one policy 70), then in step 166, the given hot-patched method can control the requested upload by canceling the intercepted file upload request, and the method ends. In CHROME™ environments, the given hot-patched method can interrupt the flow of a given request 112 in browser-executable code 114 so as to cancel the requested upload.

Returning to step 158, if the intercepted call does not comprise a given request 112 to upload a given file 116 to Internet site 45, then the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a set of files, comprising:
deploying, to a computer, a hot-patched method for an original method in a method library, wherein the method library is dynamically loaded by a software application running on the computer, wherein the hot-patched method is configured to intercept requests from the software application to the original method;
intercepting, by the hot-patched method, a request from the software application to the original method to upload a given file from the computer to an Internet site;
specifying an upload policy related to permissible characteristics of the given file or the Internet site destination, wherein the permissible characteristics include whether the given file comprises sensitive information;
making a comparison between the intercepted request to the upload policy, wherein making the comparison comprises analyzing the content of the given file to detect if the given file comprises sensitive information; and
controlling the upload in response to the comparison.

2. The method according to claim 1, wherein controlling the upload comprises canceling the upload when the comparison indicates a violation of the policy.

3. The method according to claim 1, wherein controlling the upload comprises enabling the upload to proceed when the comparison indicates no violation of the policy.

4. The method according to claim 1, wherein making the comparison comprises analyzing the given file.

5. The method according to claim 4, wherein analyzing the given file comprises analyzing the given file to detect if the given file comprises specific content.

6. The method according to claim 5, wherein the specific content comprises sensitive information.

7. The method according to claim 4, wherein analyzing the given file comprises analyzing the given file to detect if the given file comprises a specific attribute.

8. The method according to claim 7, wherein the specific attribute comprises a size of the given file.

9. The method according to claim 7, wherein the specific attribute comprises an identity of a user requesting the upload.

10. The method according to claim 7, wherein the specific attribute comprises a group for a user requesting the upload.

11. The method according to claim 7, wherein the specific attribute comprises one or more permissions for the given file.

12. The method according to claim 1, wherein the Internet site comprises a first domain, and wherein making the comparison comprises comparing the first domain to one or more specified second domains.

13. The method according to claim 1, wherein the Internet site comprises a first Internet Protocol (IP) address, and wherein making the comparison comprises comparing the first IP address to one or more specified second IP addresses.

14. The method according to claim 1, wherein the Internet site has an associated first category, and wherein making the comparison comprises comparing the first category to one or more specified second categories.

15. The method according to claim 1, wherein the software application comprises browser-executable code that can be executed by a web browser.

16. The method according to claim 15, wherein the browser-executable code comprises first browser-executable code that generates a web page element comprising second browser-executable code, and wherein intercepting the request from the software application comprises intercepting the request from the second browser-executable code.

17. An apparatus for protecting a set of files, comprising:
a memory; and
a processor configured:
to deploy, to the memory, a hot-patched method for an original method in a method library, wherein the method library is dynamically loaded by a software application running on the computer, wherein the hot-patched method is configured to intercept requests from the software application to the original method,
to intercept, by the hot-patched method, a request from the software application to the original method to upload a given file from the computer to an Internet site,
to specify an upload policy related to permissible characteristics of the given file or the Internet site destination, wherein the permissible characteristics include whether the given file comprises sensitive information;
to make a comparison between the intercepted request to the upload policy, wherein making the comparison comprises analyzing the content of the given file to detect if the given file comprises sensitive information, and
to control the upload in response to the comparison.

18. A computer software product for protecting a set of files, the computer software product comprising a non-transitory computer-readable medium, in which program instructions are stored, which instructions, when read by a computer, cause the computer:
to deploy, to the memory, a hot-patched method for an original method in a method library, wherein the method library is dynamically loaded by a software application running on the computer, wherein the hot-patched method is configured to intercept requests from the software application to the original method;
to intercept, by the hot-patched method, a request from the software application to the original method to upload a given file from the computer to an Internet site;
to specify an upload policy related to permissible characteristics of the given file or the Internet site destination, wherein the permissible characteristics include whether the given file comprises sensitive information;
to make a comparison between the intercepted request to the upload policy, wherein making the comparison comprises analyzing the content of the given file to detect if the given file comprises sensitive information, and
to control the upload in response to the comparison.

* * * * *